United States Patent [19]

Hoppmann et al.

[11] Patent Number: 5,040,668
[45] Date of Patent: Aug. 20, 1991

[54] TRANSPORT CARRIER CONVEYOR

[75] Inventors: Kurt H. Hoppmann, Falls Church; Philip S. Anderson, Sumerduck, both of Va.

[73] Assignee: Hoppmann Corporation, Chantilly, Va.

[21] Appl. No.: 658,240

[22] Filed: Feb. 20, 1991

Related U.S. Application Data

[63] Continuation of Ser. No. 356,944, May 25, 1989.

[51] Int. Cl.[5] ............................................. B65G 17/24
[52] U.S. Cl. .................................... 198/779; 198/795
[58] Field of Search ............................... 198/779, 795

[56] References Cited

U.S. PATENT DOCUMENTS

| | | |
|---|---|---|
| 1,705,703 | 3/1929 | Baker . |
| 1,852,942 | 4/1932 | Streine . |
| 2,257,230 | 9/1941 | Drake . |
| 2,342,471 | 2/1944 | Jampol . |
| 2,424,055 | 7/1947 | Rousseau . |
| 2,449,611 | 9/1948 | Lupton . |
| 2,708,023 | 5/1955 | Cushman et al. . |
| 2,829,762 | 4/1958 | Oswald . |
| 2,959,273 | 11/1960 | Sykes . |
| 3,381,798 | 5/1968 | Kornylak . |
| 3,653,489 | 4/1972 | Tullis et al. ...................... 198/779 |
| 3,986,601 | 10/1976 | Ulrich . |
| 4,143,758 | 3/1979 | Gram . |
| 4,168,775 | 9/1979 | Mueller . |
| 4,221,288 | 9/1980 | Rae . |
| 4,293,064 | 10/1981 | Robinson . |
| 4,362,238 | 12/1982 | Rivette . |
| 4,372,441 | 2/1983 | Krammer . |
| 4,515,578 | 5/1985 | Burger ............................ 198/779 X |
| 4,681,203 | 7/1987 | Kornylak . |
| 4,681,212 | 7/1987 | Miller . |
| 4,681,215 | 7/1987 | Martin . |
| 4,684,011 | 8/1987 | Schneider . |
| 4,693,356 | 9/1987 | Pi-May . |

FOREIGN PATENT DOCUMENTS

| | | |
|---|---|---|
| 1200543 | 9/1965 | Fed. Rep. of Germany ...... 198/795 |
| 1575766 | 7/1969 | France . |
| 995575 | 6/1965 | United Kingdom . |
| 1155248 | 6/1969 | United Kingdom . |

Primary Examiner—D. Glenn Dayoan

[57] ABSTRACT

An endless conveyor for moving material from a first position to a second position comprises a guide which includes a first and second track spaced apart a predetermined distance for defining a path of travel. A plurality of transport carriers are positioned in a side-by-side relationship. Each transport carrier includes a first end disposed within a first track and a second end disposed within a second track. A drive member engages each individual transport carrier and imparts movement thereof along the path of travel defined by the guide.

18 Claims, 9 Drawing Sheets

TRANSPORT CARRIER CONVEYOR

This application is a continuation of copending application Ser. No. 356,944, filed on May 25, 1989. The entire contents of which are hereby incorporated by reference.

BACKGROUND OF THE INVENTION

1. Field of the Invention

The present invention is directed to a transport carrier conveyor constructed of a plurality of transport carriers which are independently mounted relative to each other for conveying articles either along an upwardly inclined path or a substantially horizontal path.

2. Description of Background Art

Hithertofore, a number of conveyors for transporting material have been available. Belt conveyors require pulleys which must be precisely aligned in order to avoid belt run-out. In addition, belts running at a low speed track very badly. Further, belts running at a high speed require crowned pulleys to perform satisfactorily.

Chain conveyors require sprockets for driving the chains. In addition, sprockets are required for changing directions with respect to a horizontal or inclined disposition of the chains.

Roller conveyors are usually constructed with the rollers mounted in a stationary manner on a frame. The rollers are driven individually or by means of a belt. Drive shafts or gear systems are also utilized to impart movement to the rollers. Roller conveyors are also constructed with idler rollers which are fixed in a predetermined disposition. Some roller conveyors do impart movement to a plurality of rollers to rotate while being held in a fixed position along a predetermined path.

With respect to conventional conveyors, often a drive mechanism is required to be disposed adjacent to an elevated pulley. This is required in view of the fact that the conveyor belt must be pulled along its direction of travel. The positioning of a drive motor adjacent to an elevated section of the conveyor presents a number of disadvantages with respect to the mounting of the drive mechanism and the necessary support structure for affixing the drive mechanism to the conveyor housing.

SUMMARY AND OBJECTS OF THE INVENTION

It is an object of the present invention to provide a transport carrier conveyor which is guided along a predetermined path of travel for conveying material from a first position to a second position.

A further object of the present invention is to provide a transport carrier conveyor wherein a drive means periodically engages each individual transport carrier and imparts movement thereto along the path of travel defined by a guide. The drive means may be disposed adjacent to the lower portion of the conveyor and provides a pushing force to the transport carriers.

It is a further object of the present invention to provide a transport carrier conveyor which is designed for moving material from a first elevation to a second elevation displaced relative to the first elevation.

A further object of the present invention is to provide cleats which are affixed to or movably mounted relative to selective transport carriers and spaced at any distance along the path of travel for assisting in the movement of material along the endless conveyor.

A still further object of the present invention is to provide spacers disposed at each end of the transport carriers and track rollers disposed at each end of the transport carriers to enable the transport carriers to be moved along the path of travel without engaging adjacent transport carriers.

Another object of the present invention is to provide transport carriers with a flat top surface for conveying predetermined objects.

Another object of the present invention is to provide hollow transport carriers with an open top for conveying material.

A still further object of the present invention is to provide a force to the transport carriers to cause the transport carriers either to rotate in a reverse direction or in a forward direction to manipulate the articles being conveyed.

These and other objects of the present invention are achieved by providing an endless conveyor for moving material from a first position to a second position. A guide includes a first and a second track spaced apart a predetermined distance for defining a path of travel. A plurality of transport carriers, each transport carrier including a first end disposed within the first track and a second end disposed within the second track. The transport carriers are positioned in a side-by-side relationship. A first spacer is mounted on the first end and a second spacer is mounted on the second end. The first and second spacers space the transport carriers relative to each other so as to prevent rotation. A drive member is provided for engaging the transport carriers and imparting movement thereto along the path of travel defined by the guide.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
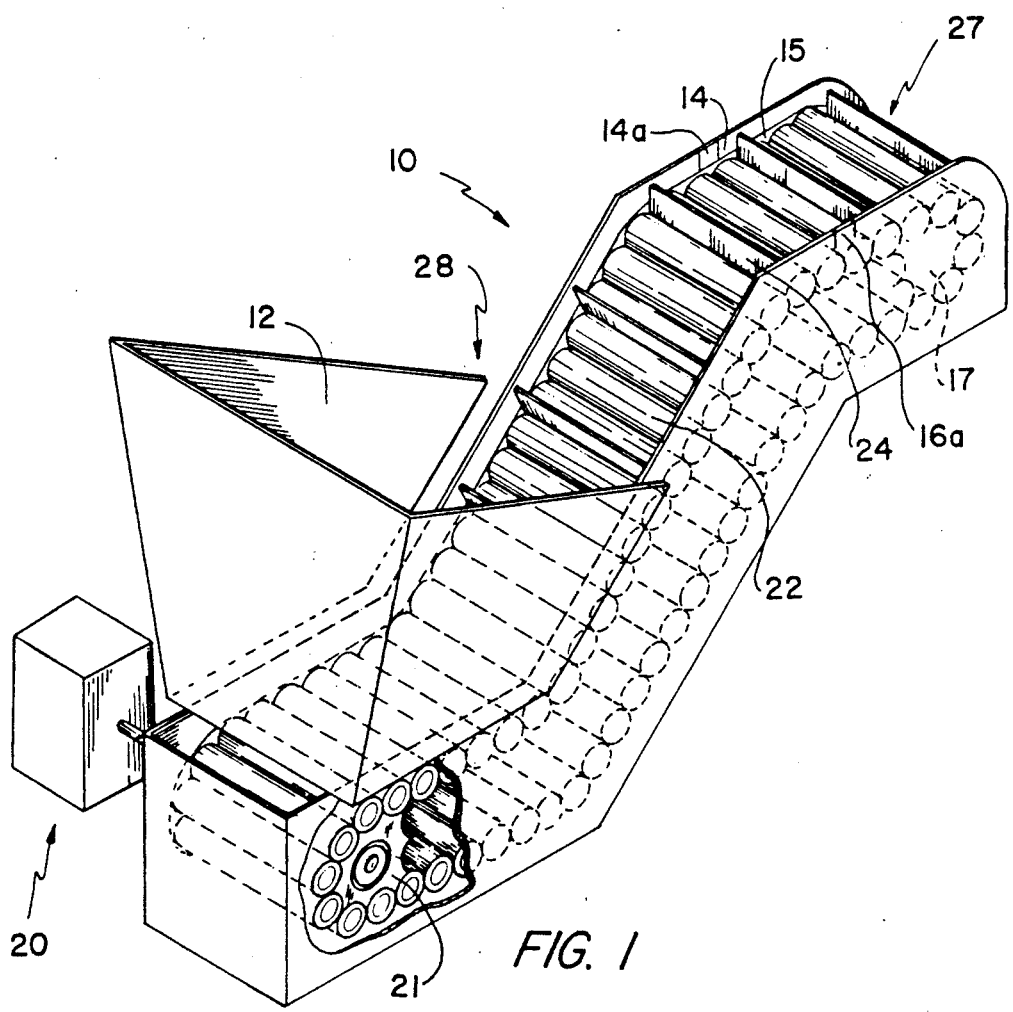
FIG. 1 is a perspective view illustrating the endless conveyor according to the present invention.
Figure 2:
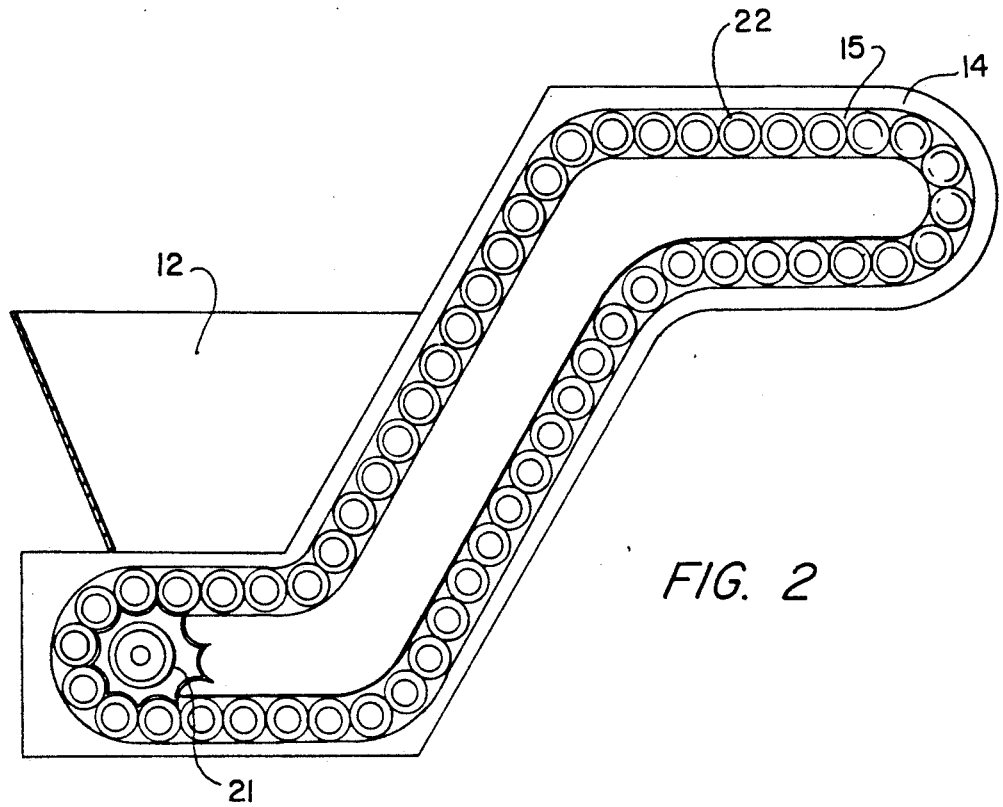
FIG. 2 is a cross-sectional view of the endless conveyor illustrated in FIG. 1.

As illustrated in FIGS. 1 and 2, an endless conveyor 10 is provided with a plurality of transport carriers 22 disposed adjacent to each other in a side-by-side relationship. A guide is provided including a first guide wall 14 having a first track 15 defined by a portion of the guide 14.

Similarly, the guide wall 16 includes a second track 17 disposed within a portion of the guide wall 16. The plurality of transport carriers 22 are mounted between the guide walls 14, 16 and are confined to travel along a predetermined path.

As illustrated in FIGS. 1 and 2, the plurality of transport carriers 22 are disposed beneath the area adjacent to a hopper 12. Thereafter, the path of travel of the transport carriers 22 is disposed upwardly towards a discharge area 27. Cleats 24 may be positioned at any desired distance adjacent the transport carriers to assist in the conveyance of material or articles upwardly along the inclined section 28 of the endless conveyor 10.

A drive means 20 is disposed to engage a sprocket 21. The sprocket 21 actually pushes the transport carriers 22 upwardly and along the path of travel. This arrangement is distinct from conventional belt conveyors which require the motor to be positioned at the elevated section of the conveyor. The positioning of a motor at the elevated section of the conveyor is necessary with a conventional belt conveyor due to the fact that a conventional belt conveyor requires the motor to pull the conveying belt.

Figure 3:
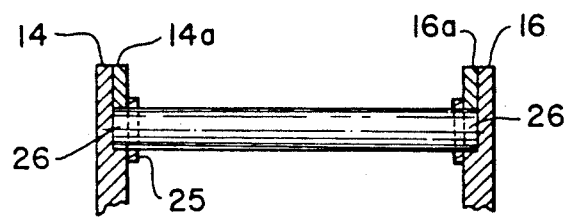
FIG. 3 is a partial cross-sectional view illustrating the positioning of a transport carrier relative to the first and second tracks.
Figure 5:
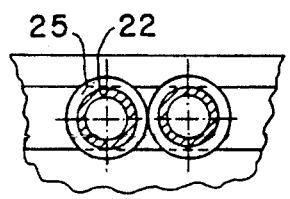
FIG. 5 is a cross-sectional view illustrating the positioning of the spacer roller relative to a transport carrier.
Figure 7:
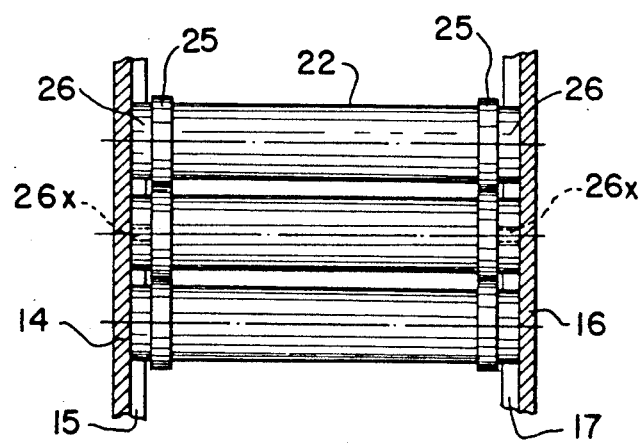
FIG. 7 is a top plan view with the track section shown in partial cross section.

FIGS. 3, 5 and 7 illustrate an arrangement of the transport carrier 22 relative to the guide walls 14, 16. More specifically, spacers 25 are disposed at a first end and a second end of the transport carrier 22. In addition, a track roller 26 is disposed at a first end and a second end of the transport carrier 22. The track rollers may be mounted on an axle 26x for facilitating rotation of the track roller. The guide walls 14, 16 include a removable section 14a, 16a, respectively, in order to enable selected transport carriers 22 to be removed from the path of travel for maintenance or replacement.

The spacer rollers 25 are designed to have an enlarged diameter relative to the diameter of the transport carriers 22. In this manner, the spacer rollers 25 maintain the transport carriers 22 in a spaced apart relationship. Thus, the transport carriers 22 can be moved along the path of travel without engagement. The transport carriers 22 will not rotate relative to each other due to the positioning of the spacer rollers 25 at each end of the transport carriers 22.

Figure 4:
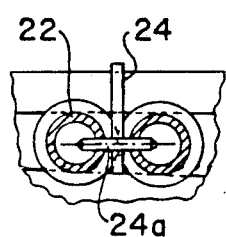
FIG. 4 is a partial cross-sectional view illustrating the positioning of a cleat relative to two adjacent transport carriers.

FIG. 4 is a partial cross-sectional view illustrating the positioning of a cleat 24 relative to two adjacent transport carriers 22. A pin 24a is utilized to affix the cleat 24 in a predetermined position relative to the two transport carriers 22.

Figure 6:
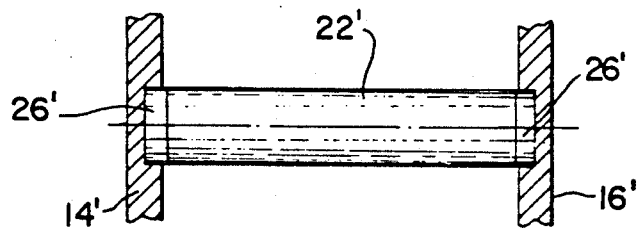
FIG. 6 is a partial cross-sectional view illustrating one embodiment of the present invention wherein track rollers are disposed within the first and second tracks.

FIG. 6 illustrates another embodiment of the present invention wherein a transport carrier 22' is disposed between guide walls 14', 16'. Track rollers 26' are disposed at a first end and a second end of the transport carriers 22'. The track rollers 26' are designed to roll along the first and second tracks disposed within the guide walls 14', 16'.

Figure 8:
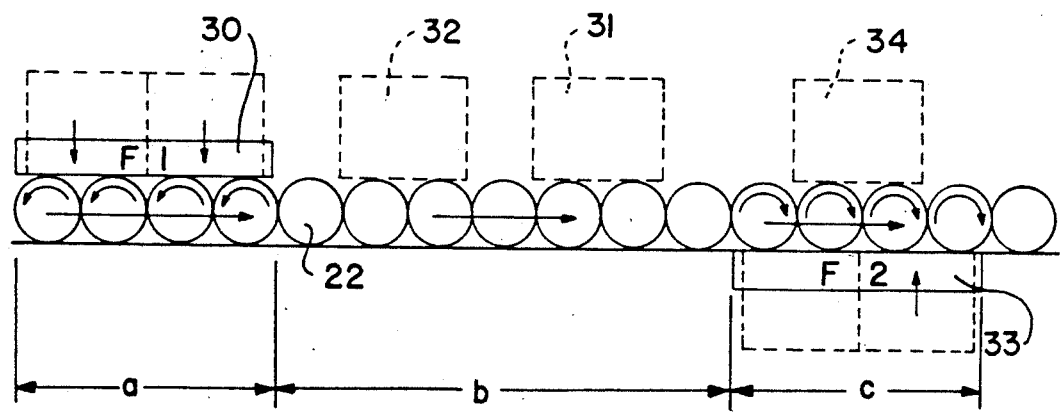
FIG. 8 is a schematic view illustrating a number of sections of an endless conveyor.

FIG. 8 illustrates a section of an endless conveyor according to the present invention. The transport carriers 22 are confined to travel along a predetermined path. As illustrated in FIG. 8, the path is a substantially horizontal path.

Figure 9:
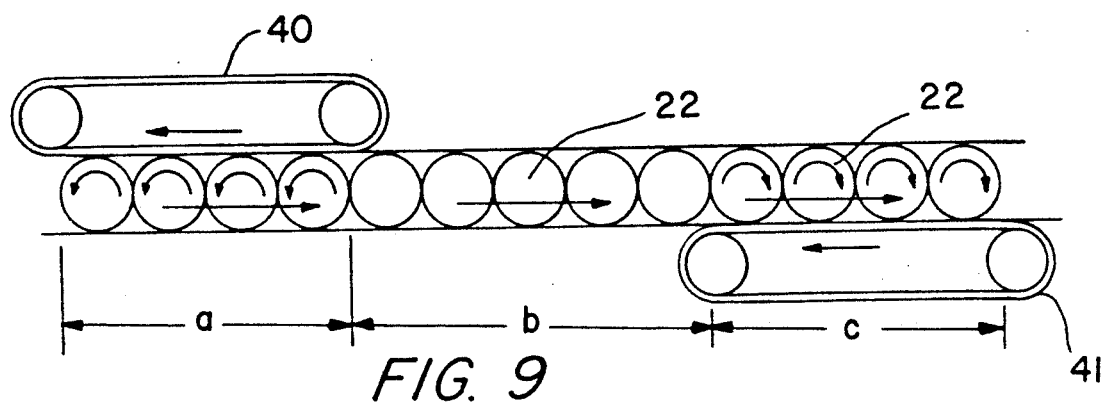
FIG. 9 is a schematic view illustrating a number of sections of an endless conveyor.

A rod 30 may be utilized to engage a portion of the transport carriers 22 at one end thereof. A force F1 is applied to the rod 30 to hold the rod 30 relative to the upper surface of the transport carriers 22. In this way, if the rod 30 engages an upper surface of the transport carriers 22, the top surface of the transport carriers 22 will rotate in a direction opposite to the path of travel. In this way, objects can be retained in a fixed location on a section a of the endless conveyor for spacing the articles relative to each other. For a horizontal conveyor, such a rod, or belt 40 as illustrated in FIG. 9, can avoid parts or articles from pressing against each other. Parts which are pressed together could result in part damage or "shingling" which are both undesirable. The section b of the conveyor illustrated in FIG. 8 represents the normal operation of the endless conveyor. Objects 31, 32 are positioned on the transport carriers 22 and are moved along the path of travel.

Section c of the endless conveyor illustrated in FIG. 8 represents a section wherein a rod 33 engages a portion of the lower surface of the transport carriers 22. In this manner, as a force F2 is applied to a lower surface of the transport carrier 22, the transport carrier rotate in the same direction as the path of travel. Thus, an object 34 disposed in section c of the endless conveyor will be accelerated at twice the speed of the transport carriers 22 due to the fact that the transport carriers 22 in this particular section c rotate at twice the speed of the endless conveyor. This procedure, as well as the result achieved by belt 41 as illustrated in FIG. 9, will result in the spacing of parts or articles. For packing procedures, such spacing is very desirable since it permits definite handling of each individual part or article.

FIG. 9 is another embodiment of the present invention illustrating a plurality of sections of a conveyor system. A belt 40 is disposed adjacent to an upper surface of the transport carriers 22 along a section a. The belt 40 rotates in a direction opposite to the path of the travel of the transport carriers 22. In this manner, as the belt 40 rotates, the top surface of the transport carriers 22 will rotate in an opposite direction relative to the path of travel.

Section b illustrates a normal path of travel of the transport carriers 22. This path of travel is similar to section b as illustrated in FIG. 8.

As illustrated in FIG. 9, section c includes a belt 41 disposed adjacent to a lower surface of the transport carriers 22. The belt 41 rotates in the opposite direction as the path of travel. Thus, the top surface of the transport carriers 22 rotate in the same direction of the path of travel for accelerating articles disposed within the section c of the endless conveyor.

Figure 10:
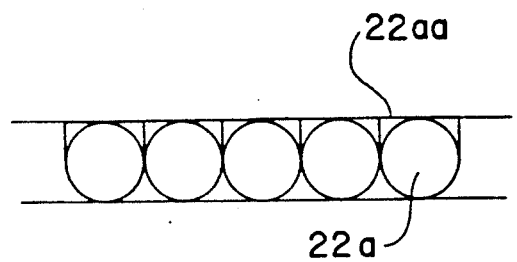
FIG. 10 is a side elevational view illustrating another embodiment of the present invention wherein the transport carriers include a flat top portion.

FIG. 10 illustrates another embodiment of the present invention wherein the transport carriers 22a include a flat top 22aa. In this way, the transport carriers 22a may be used to transport predetermined objects or material having a certain characteristic requiring a flat surface.

Figure 11:
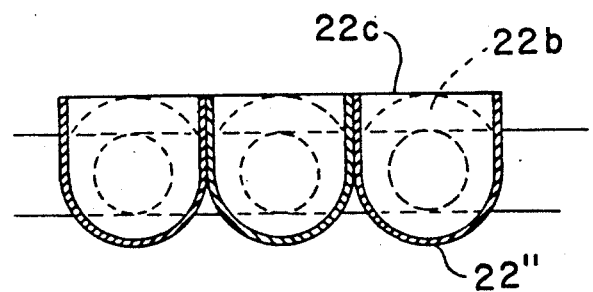
FIG. 11 is a cross-sectional view illustrating another embodiment of the present invention wherein the transport carriers are hollow and include an open top.

FIG. 11 illustrates another embodiment of the present invention wherein the transport carriers 22" include a hollow interior portion 22b. In addition, an open top 22c provides access for material to be disposed within the hollow portion 22b.

Figure 12:
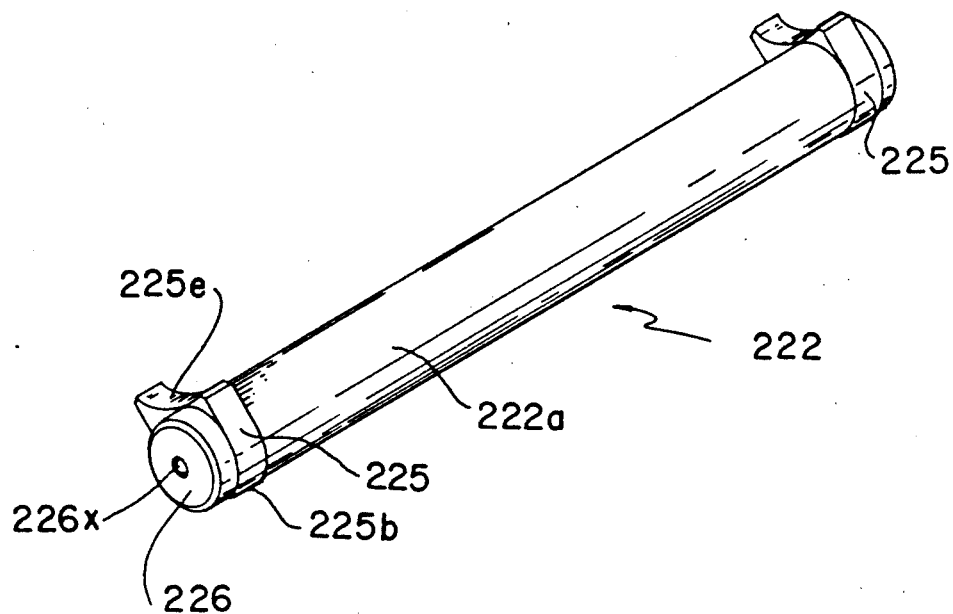
FIG. 12 is a perspective view illustrating another embodiment of a transport carrier having a pitch spacer disposed on each end of the transport carrier adjacent to the track roller.
Figure 18:
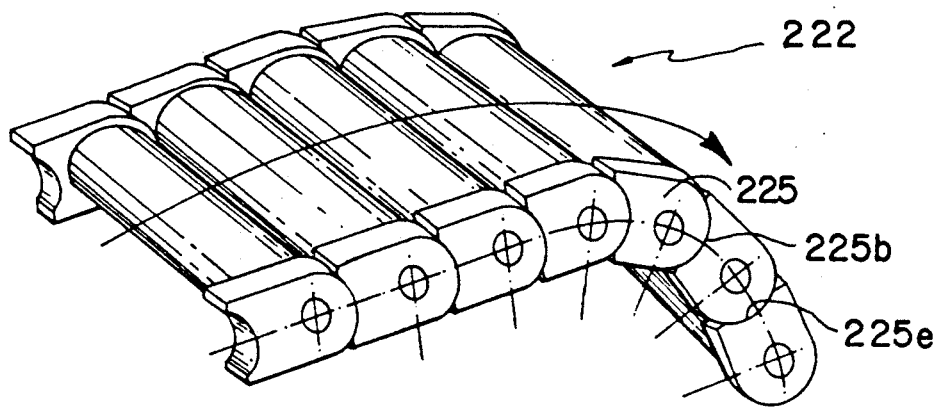
FIG. 18 is a perspective view of a transport carrier illustrating the disposition of the pitch spacers relative to each other.
Figure 19:
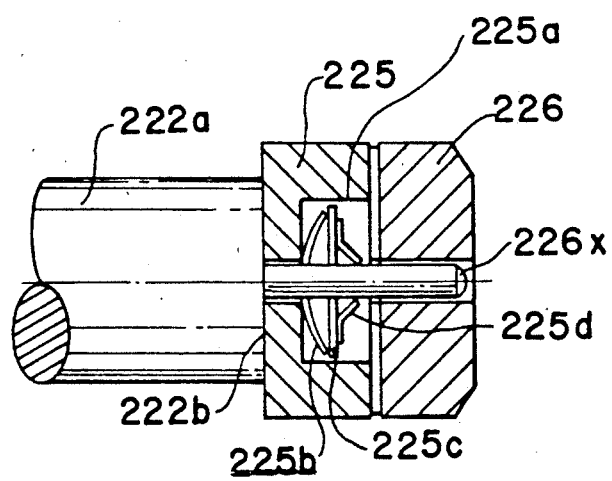
FIG. 19 is a partial cross-sectional view illustrating the positioning of the braking spring mounted within the pitch spacer.

FIGS. 12, 18 and 19 illustrate another embodiment of a transport carrier according to the present invention. The transport carrier 222 includes a substantially cylindrical central portion 222a which is similar to the transport carrier 22 of the other embodiments of the present invention. An axle 226x is provided which extends through the cylindrical section of the transport carrier 222. A pitch spacer 225 is mounted on the axle 226x. A spacing washer is disposed between the cylindrical section 222a of the transport carrier 222 and the pitch spacer 225.

Each pitch spacer 225 includes a grooved centrally disposed recess 225a for receiving a braking spring 225b, a thrust washer 225c and a retainer 225d mounted on the axle 226x for retaining the pitch spacer 225 on the axle 226x adjacent to the cylindrical section 222a. A pitch spacer 225 is mounted on each end of the cylindrical portion 222a. In addition, a track roller 226 is mounted on the axle 226x adjacent to the pitch spacer 225.

The braking spring 225b serves to control the spinning of the cylindrical section 222a of the transport carrier 222. The pitch spacer 225 is non-rotatable and includes the recess 225a in which the braking members are positioned. The braking spring 225b applies a force to the non-rotating pitch spacer 225 which is transmitted to the transport carrier bearing surface 222b. Tension is determined by the position maintained by the thrust washer 225c and the retainer 225d. In a preferred embodiment of the present invention, the thrust washer 225c and the retainer 225d may be constructed as an integral unit. Braking friction is controlled by the retainer setting. The entire arrangement may be encapsulated within the pitch spacer 225 and not visible from the outer surface of the pitch spacer 225 once assembled. In addition, the entire arrangement may be encapsulated within the transport carrier 222 and not visible from the outer surface of the transport carrier 222 once assembled.

The embodiment of the present invention as illustrated in FIGS. 12, 18 and 19 provides a positive spacing arrangement between adjacent transport carriers 222. More specifically, the pitch spacers 225 include a concave portion 225e. The concave portion 225e will mate with a rounded portion 225b of an adjacent pitch spacer 225. In this way, a positive spacing of the transport carriers 222 is achieved. The cylindrical central portion 222a of the transport carriers 222 will not touch each other, and therefore, will not rotate as they are conveyed along the guide tracks.

The transport carriers 225 are driven forward in a controlled manner by means of the mating non-rotatable pitch spacers 225. The pitch spacers 225 possess a geometry which allows them to drive the transport carriers 222 through turns or straight sections of track while maintaining the proper centerline and pitch of the transport carrier 222. The transport carriers 222 are independent of one another and forward movement is created by each transport carrier 222 pushing on an adjacent transport carrier 222 positioned in the forward direction.

Figure 13:
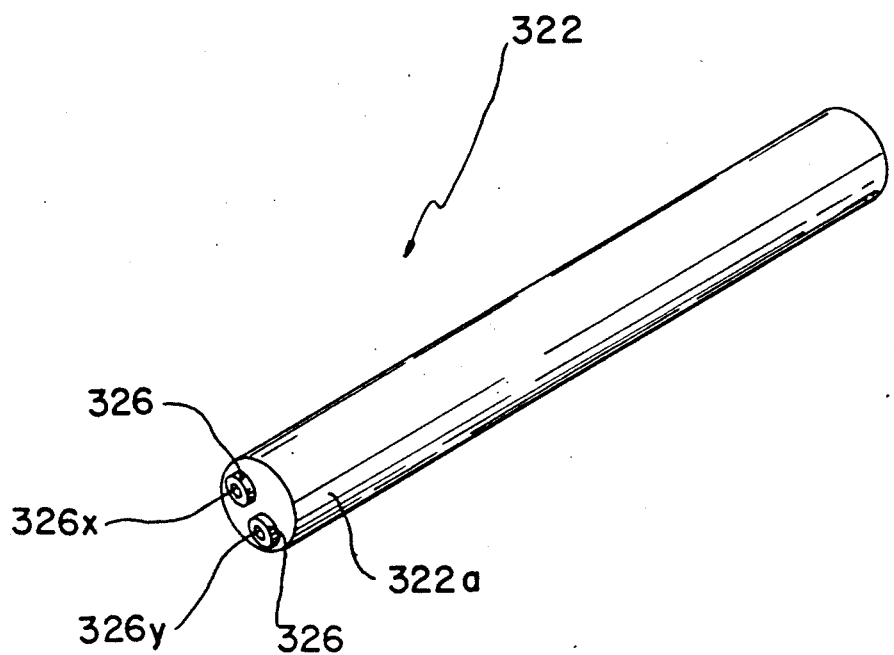
FIG. 13 is a perspective view illustrating another embodiment of a transport carrier having two shafts each having a track roller mounted thereon.

FIG. 13 is a perspective view of another embodiment of the present invention. A transport carrier 322 is provided with a central cylindrical portion 322a. Axles 326x and 326y are provided which extend through the cylindrical portion 322a. A track roller 326 is mounted on each end of the axles 326x and 326y. The arrangement of the rollers 326, as illustrated in FIG. 13, will permit the transport carrier 322 to traverse along the guide track. However, due to the fact that two axles 326x and 326y are provided, the central cylindrical section 322a will not rotate. Rotation of the central cylindrical section is prevented due to the fact that the two axles 326x and 326y prevent the central cylindrical section 322a from rotating.

Figure 14:
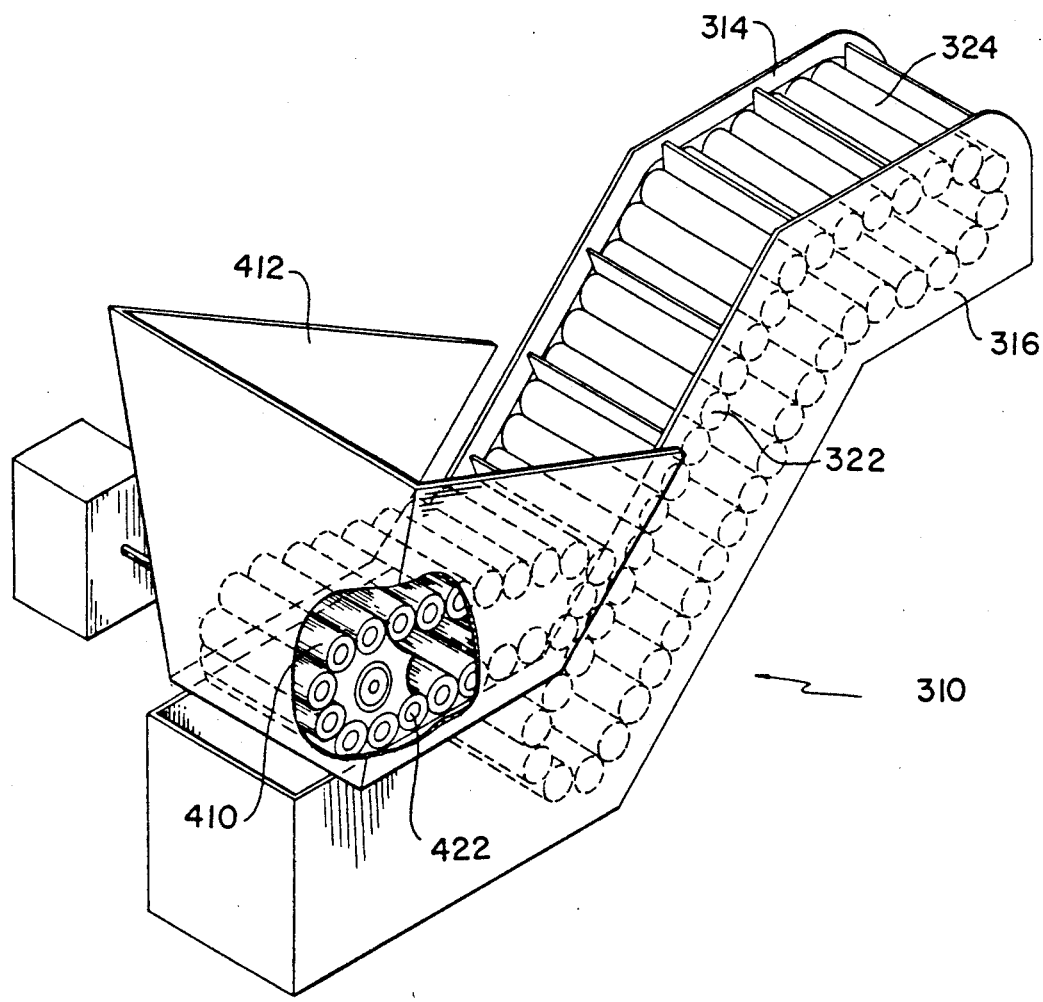
FIG. 14 is a perspective view illustrating an endless conveyor according to the present invention and further including an assist conveyor mounted within the supply hopper to assist with the delivery of objects or material to the endless conveyor.

FIG. 14 is a perspective view of another embodiment of the present invention. This embodiment is similar to the embodiment as illustrated in FIG. 1. However, an additional transport carrier conveyor 410 is provided within the hopper 412. The additional transport carrier conveyor 410 includes a plurality of transport carriers 422 which are designed to traverse a predetermined path within the lower portion of the hopper 412. In this manner, objects disposed within the hopper 412 can be advanced towards the transport carrier conveyor 310 when additional material or objects are desired. The transport carrier conveyor 310 includes sidewalls 314, 316, mounted a predetermined distance apart. Cleats 324 are spaced at any desired distance along the conveyor path between adjacent transport carriers 322. In this way, objects disposed within the hopper 412 which are advanced by means of the transport carrier 410 can easily be elevated to a discharge area.

Figure 15:
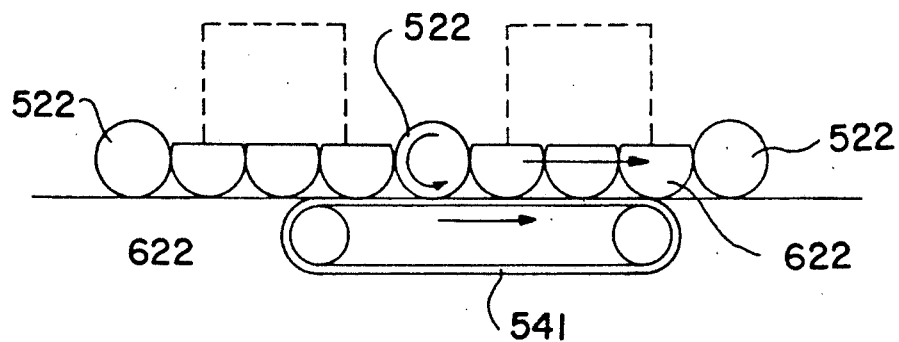
FIG. 15 is a schematic view illustrating a number of sections of an endless conveyor with a variety of different transport carriers.

FIG. 15 is a schematic view illustrating that a number of different transport carriers may be disposed along a transport carrier conveyor. More specifically, a circular transport carrier 522 may be disposed adjacent to a transport carrier 622 having a substantially flat top portion. In this matter, a desired area having a flat surface to retain a specific object having a certain size is provided. Of course, the number of transport carriers 622 having a substantially flat top portion may be varied depending on the particular application. The arrangement of a substantially cylindrical transport carrier 522 adjacent to a transport carrier 622 having a flat top portion permits spacing and respacing of objects. A stationary belt 541 will enable the cylindrical transport carriers 522 to rotate in a direction opposite to the direction of movement of the transport carrier conveyor. Thus, objects which engage the cylindrical transport carriers 522 will be reduced in speed to thereby permit pacing and respacing of the objects.

Figure 16:
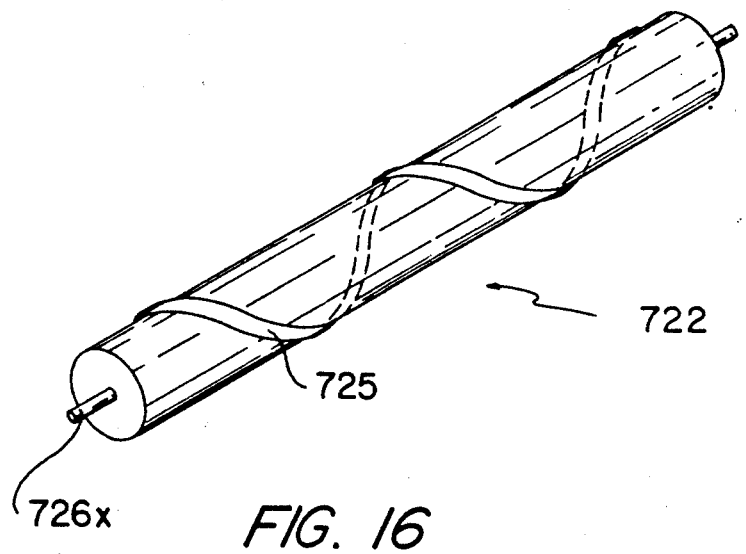
FIG. 16 is a perspective view of another embodiment of a transport carrier having a screw discharge configuration on the outer surface thereof.
Figure 17:
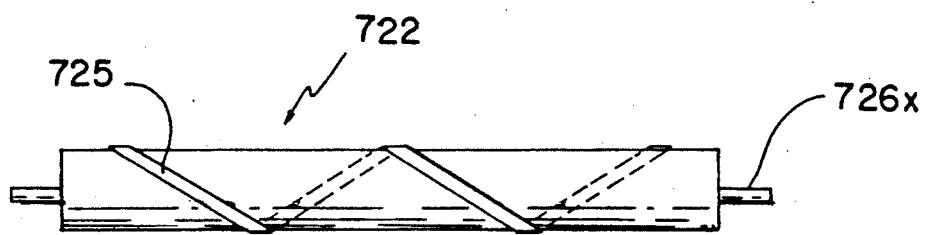
FIG. 17 is side elevational view of the transport carrier as illustrated in FIG. 16.

FIGS. 16 and 17 illustrated another embodiment of the present invention wherein the transport carrier 722 includes a screw top portion 725. An axle 726x projects through the transport carrier 722. In this manner, the transport carrier 722 is permitted to rotate on the axle 726x. Due to the screw top 725, articles which engage the transport carriers 722 are discharged in the direction of the screw conveyor. Thus, objects arriving to a predetermined section of a transport carrier conveyor can be discharged laterally off of the transport carrier conveyor to another work station or discharge area.

The present invention provides a number of improvements over conventional belt conveyors. More specifically, the cleats 24 may be mounted at any distance relative to each other. Thus, the cleats 24 may be easily affixed between two adjacent transport carriers 22 or may be removed therefrom. The positioning of the cleats 24 is relatively simple and may be changed at any time. This feature of the present invention permits the transport carrier conveyor to be easily changed to accommodate various sizes of objects or different material to be conveyed.

Figure 20:
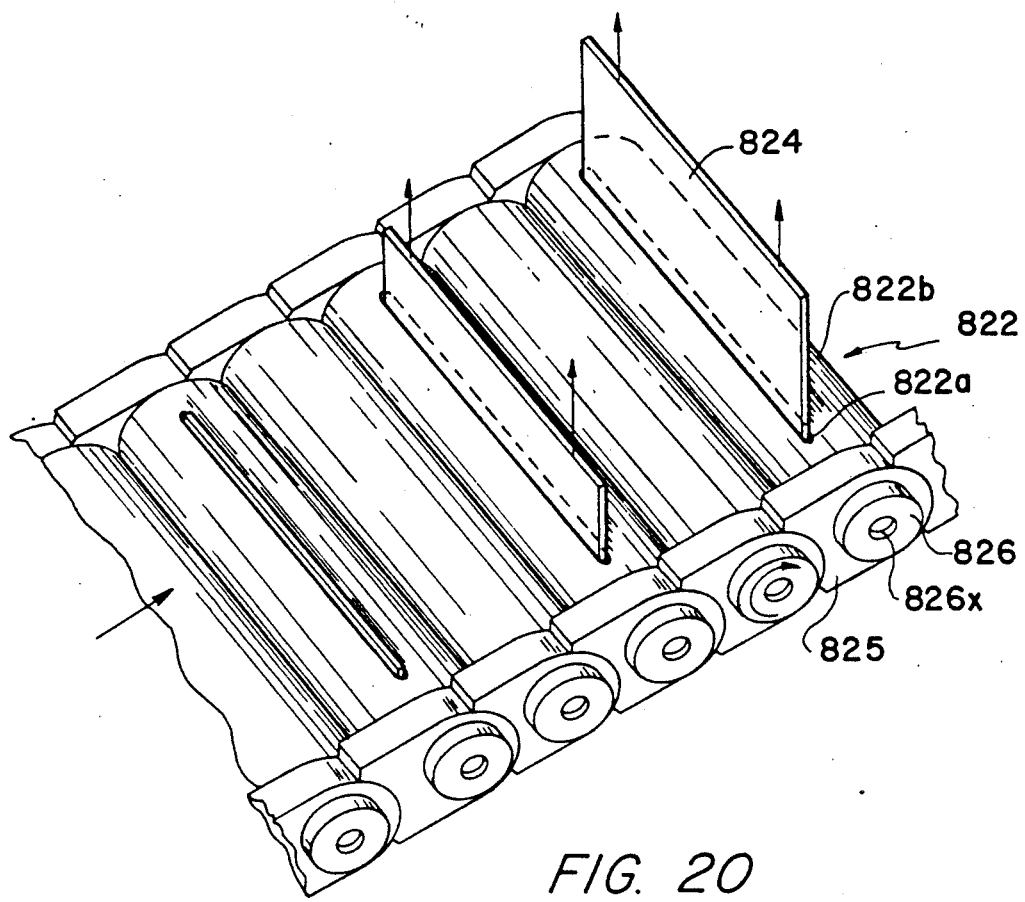
FIG. 20 is a perspective view of a transport carrier including movable cleats.
Figure 21:
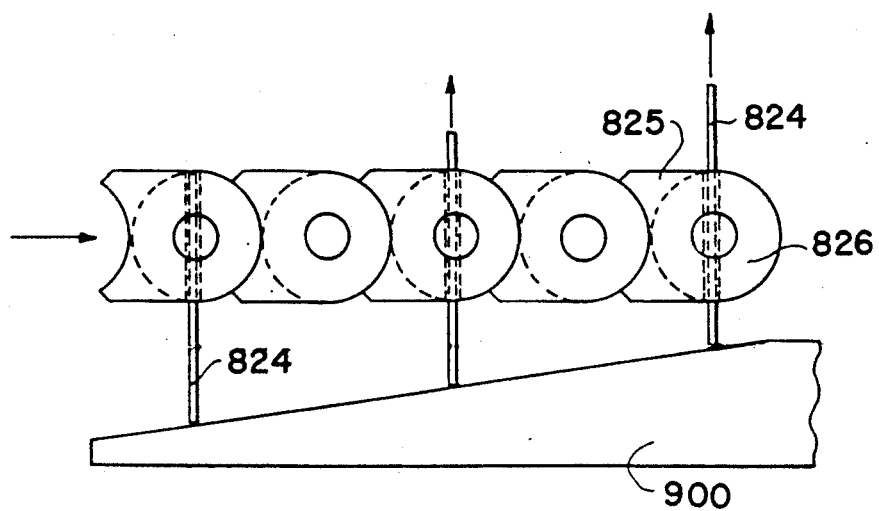
FIG. 21 is a side view of the transport carrier as illustrated in FIG. 20.

In addition, as illustrated in FIGS. 20 and 21, a transport carrier 822 may include an aperture 822a through which a movable cleat 824 is positioned. As illustrated in the previous embodiments of the present invention, a pitch spacer 825 is mounted on an axle 826x extending from the cylindrical central portion 822b of the transport carrier 822. A track roller 826 is mounted on the axle 826x.

As illustrated in FIG. 21, the movable cleats 824 may be raised or lowered by means an elevating cam 900. During a predetermined portion of travel of the transport carriers 822, the movable cleat 824 may be at a position which is below an upper surface of the transport carrier 822. Thereafter, the movable cleats 824 may be gradually elevated to a raised position wherein the movable cleat 824 extends above an upper surface of the transport carrier 822. The motion of the movable cleats 824 to an elevated position or a lowered position is accomplished during movement of the transport carriers 822 along the path of travel. The movable cleats 824 are maintained in a vertical orientation in relationship to the conveyor track by means of non-rotating pitch spacers 825 which are an integral part of the cylindrical section 822b of the transport carrier 822. Although the transport carriers 822 are maintained in a fixed orientation, conveying is accomplished by movement of the track rollers 826 along a grooved track. The track rollers 826 turn freely as they move along the grooved track.

The elevating cam 900 illustrated in FIG. 21, may be a fixed cam surface which is disposed at a predetermined position along the path of travel. In addition, the elevating cam 900 may be a movable cam actuated at a predetermined time to elevate the movable cleats 824 to be disposed above an upper surface of the transport carriers 822.

In addition, the transport carriers can be easily changed. Round transport carriers 22 or transport carriers having a flat top 22a may be interchanged at any time. Any shape of transport carrier may be used together with the present invention.

The transport carrier illustrated in FIG. 13 is particularly useful with respect to the positioning of a cleat along the conveyor path. Due to the fact that the transport carrier 322 does not rotate, a cleat positioned on the transport carrier 322 would be held in a fixed vertical position. The cleat would not move as it is conveyed along the transport carrier conveyor.

The versatility of the conveyor structure according to the present invention is obvious if the various functions are considered which can be performed with the simple construction of the transport carrier conveyor. There is also a considerable economy in construction and in maintenance of such conveyors. Single transport carrier or transport carrier parts can be replaced without special tools or special skills. Cleaning of the conveyor can be facilitated by simply removing all transport carriers from the track plates. Various materials can be used for the transport carriers for acquiring most desirable results. A conveyor can also be easily changed in length by simply adding or subtracting track plates and the equivalent amount of transport carriers. Transport carriers of special shape can also be installed and easily changed with more conventional ones at moment's notice. For example, while the majority of applications may favor round transport carriers, it is also conceivable to use transport carriers with flat tops or hollow transport carriers with open tops for certain applications.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An endless conveyor for moving material from a first position to a second position comprising:
   a guide including a first and second track spaced apart a predetermined distance for defining a continuous path of travel;
   a plurality of discrete transport carriers, each transport carrier including a first end disposed within said first track and a second end disposed within said second track, said transport carrier being positioned in a side-by-side relationship;
   a first spacer mounted on said first end of said transport carrier and a second spacer mounted on said second end of said transport carrier, said first and second spacers prevent contact of said transport carriers disposed adjacent to each other for normally preventing rotation of said transport carriers; and
   drive means for engaging and pushing said transport carriers and imparting movement thereto along said continuous path of travel defined by said guide.

2. The endless conveyor according to claim 1, and further including cleats affixed to selected transport carriers and spaced at a desired distance along said path.

of travel for assisting in the movement of material along said endless conveyor.

3. The endless conveyor according to claim 2, wherein said cleats are affixed between predetermined adjacent transport carriers.

4. The endless conveyor according to claim 1, wherein each said transport carrier includes a first track roller mounted on said first end of said transport carrier and a second track roller mounted on said second end of said transport carrier, said first and second track rollers being mounted within said first and second tracks, respectively, for permitting rotation of the track rollers.

5. The endless conveyor according to claim 1, wherein said first and second tracks are grooves formed in a thickness of the guide for confining the transport carriers to travel along a predetermined path of travel.

6. The endless conveyor according to claim 1, wherein said plurality of transport carriers are substantially cylindrical in shape.

7. The endless conveyor according to claim 1, wherein said plurality of transport carriers include a body portion having a substantially flat top surface.

8. The endless conveyor according to claim 1, wherein said plurality of transport carriers are substantially hollow and cylindrical in shape with an open top portion for enabling material to be contained therein.

9. The endless conveyor according to claim 6, wherein said first and second spacers are substantially cylindrical in shape with a larger diameter as compared to the diameter of said transport carrier for spacing adjacent transport carriers relative to each other to prevent rotation.

10. The endless conveyor according to claim 1, and further including an axle projecting from said first and second ends of each of said transport carriers for mounting said first and second spacers thereon.

11. The endless conveyor according to claim 1, and further including two axles spaced relative to each other and projecting from said first and second ends of each of said transport carriers for mounting track rollers on each of said axles for guiding said transport carrier along said first and second track while preventing rotation of said transport carrier.

12. The endless conveyor according to claim 1, wherein said selected transport carriers include a screw top disposed on an outer surface thereof for assisting in the discharge of material in a lateral direction relative to the direction of travel of said endless conveyor.

13. The endless conveyor according to claim 1, and further including a rod operatively mounted adjacent to an upper surface of a predetermined number of transport carriers and being selectively engageable with said upper surface to apply a force thereto to cause said predetermined number of transport carriers to rotate in a direction opposite to the movement of said plurality of transport carriers along the path of travel.

14. The endless conveyor according to claim 1, and further including a rod operatively mounted adjacent to a lower surface of a predetermined number of transport carriers and being selectively engageable with said lower surface to apply a force thereto to cause said predetermined number of transport carriers to rotate in a direction of movement of said plurality of transport carriers along the path of travel.

15. The endless conveyor according to claim 1, and further including a belt operatively mounted adjacent to an upper surface of a predetermined number of transport carriers and being selectively engageable with said upper surface to apply a force thereto to cause said predetermined number of transport carriers to rotate in a direction opposite to the movement of said plurality of transport carriers along the path of travel.

16. The endless conveyor according to claim 1, and further including a belt operatively mounted adjacent to a lower surface of a predetermined number of transport carriers and being selectively engageable with said lower surface to apply a force thereto to cause said predetermined number of transport carriers to rotate in a direction of movement of said plurality of transport carriers along the path of travel.

17. The endless conveyor according to claim 1, and further including an aperture extending through selected transport carriers, a cleat movably mounted within said aperture to be in a retracted position below an outer surface of said transport carrier and an elevated position projecting above said outer surface of said transport carrier.

18. The endless conveyor according to claim 17, and further including an elevating cam for guiding the movement of said cleat.

* * * * *